H. B. WHITE.
BOW REST AND CLAMPING DEVICE.
APPLICATION FILED MAY 23, 1914.
Reissued Oct. 27, 1914. 13,819.
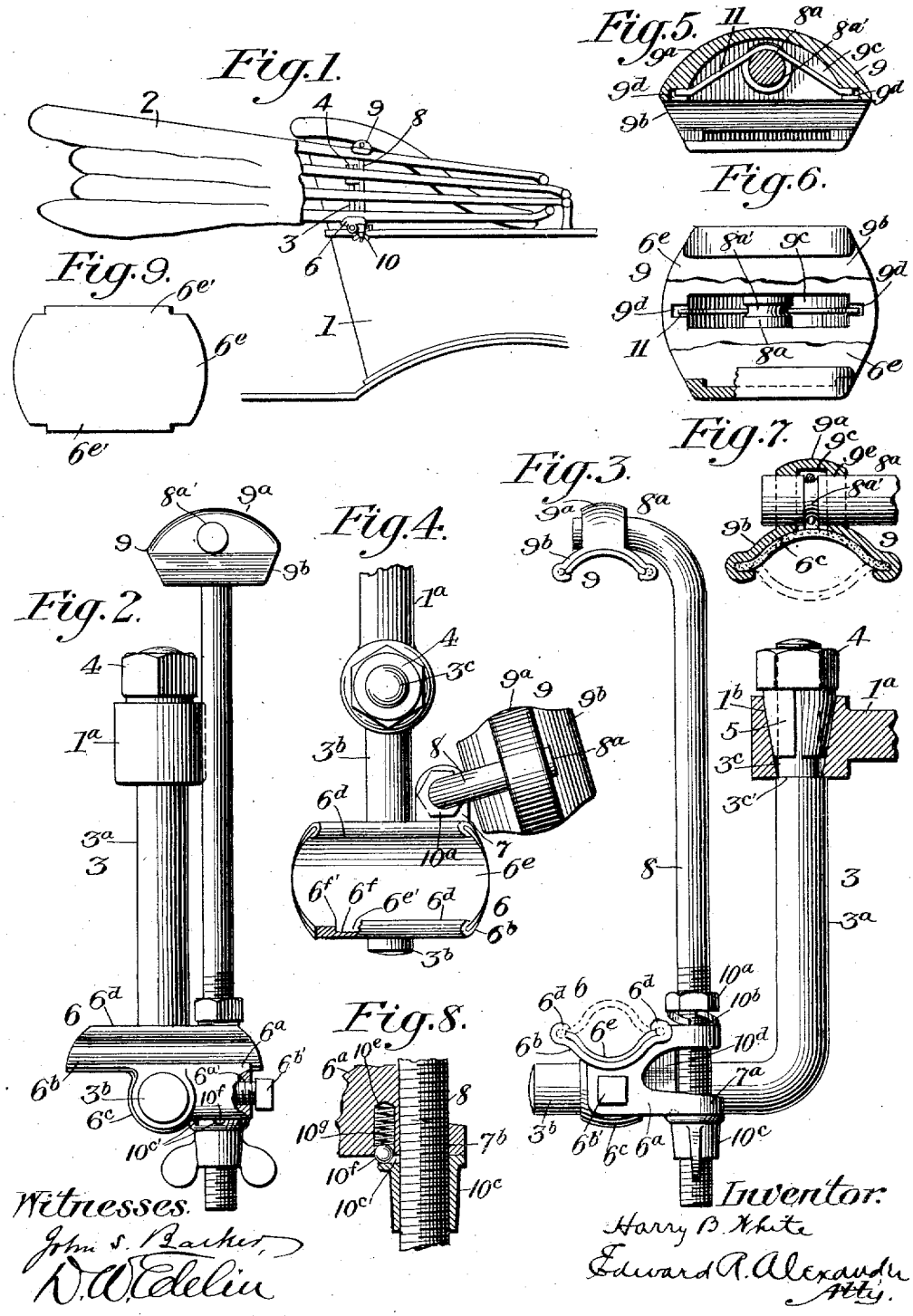
THE NORRIS PETERS CO., PHOTO-LITHO., WASHINGTON, D. C.

UNITED STATES PATENT OFFICE.

HARRY B. WHITE, OF CANTON, OHIO, ASSIGNOR TO THE GILLIAM MANUFACTURING COMPANY, OF CANTON, OHIO, A CORPORATION OF OHIO.

BOW REST AND CLAMPING DEVICE.

13,819. Specification of Reissued Letters Patent. Reissued Oct. 27, 1914.

Original No. 1,046,356, dated December 3, 1912, Serial No. 692,369. Application for reissue filed May 23, 1914. Serial No. 840,642.

*To all whom it may concern:*

Be it known that I, HARRY B. WHITE, a citizen of the United States, residing at Canton, in the county of Stark and State of Ohio, have invented certain new and useful Improvements in and Relating to Bow Rests and Clamping Devices, of which the following is a specification.

This invention relates to a device for supporting and holding or clamping the bows of a vehicle top in a folded or collapsed condition.

For the purpose of illustration, I have, in the accompanying drawings, shown and herein described one form of apparatus embodying my invention.

In the drawings: Figure 1 is a side elevation of a vehicle having a top that is folded down, and supported and clamped by a device embodying my invention. Fig. 2 is a front elevation of the device. Fig. 3 is a side elevation thereof. Fig. 4 is a top plan view with the clamp plate rotated to an inoperative position. Figs. 5, 6, 7 and 8 are detail views, partly in section. Fig. 9 is a plan view of the pad.

In the drawings, 1 indicates a vehicle of any suitable construction, the body of which is provided with a foldable or collapsible top 2. This top may also be of any approved form and construction. The top 2 is supported by sets of bows $2^a$ which are connected to the vehicle 1 and swing rearwardly and downwardly to the position shown in Fig. 1 in the usual manner.

$1^a$ indicates brackets (only one being shown) which are preferably fixed to and extend laterally from either side of the vehicle body at a point rearward of the pivot connection of the bows $2^a$ therewith. At its outer end the bracket $1^a$ is enlarged and formed with an opening $1^b$, the inner wall of which is preferably of conical shape.

3 indicates a supporting member, preferably comprising a rod $3^a$ which is connected to and depends from the bracket $1^a$. At its lower end the rod carries a horizontal arm $3^b$ which may be integrally formed with the rod $3^a$. The upper free end of the rod $3^a$ extends through the opening $1^b$, it being reduced as shown at $3^c$ to form a shoulder $3^{c\prime}$, which engages the lower side or face of the bracket. The reduced end $3^c$ of the rod is provided with screw threads to take a nut 4. Surrounding the reduced end $3^c$ is a split collar 5 the outer wall of which is conically shaped to fit the conical walls of the opening $1^b$. When these parts are arranged as just described and the nut 4 is tightened, the collar 5 will be forced downwardly and through the engagement of its outer wall with the inner wall of the opening $1^b$, the collar will be contracted into snug engagement with the reduced end $3^c$. The effect of this operation will be to rigidly connect the rod $3^a$ to the bracket $1^a$.

6 indicates a rest member movable laterally, that is, toward and from the vehicle 1, and also angularly on the arm $3^b$. This member preferably comprises a body $6^a$, a plate $6^b$ on which the lowermost bow of the set rests and a collar or sleeve $6^c$ through which the arm $3^b$ extends, all of these parts being preferably formed integral. The plate $6^b$ is preferably channeled to receive and prevent lateral movement of the lowermost bow.

$6^{a\prime}$ indicates an opening extending through the body $6^a$ and screw-threaded to receive a bolt $6^{b\prime}$, whereby the rest member 6 can be fixed in its adjusted position to the arm $3^b$. Along its opposite longitudinal edges the plate $6^b$ may be provided with lips $6^d$ which are bent over and extend toward each other. These lips are spaced from the upper face of the plate $6^b$ to form a recess to receive the opposite longitudinal edges of a pad $6^e$ and thus hold the latter in position thereon. At $6^f$ the inner walls of the lips $6^d$ are cut away intermediate the ends of the plate $6^b$ to form recesses the end walls of which serve as abutting shoulders $6^{f\prime}$, $6^{f\prime}$.

As shown in the drawings, the pad $6^e$ is provided with projecting members $6^{e\prime}$ along its opposite sides, which members fit the recesses $6^f$. The opposite end walls of the projecting members $6^{e\prime}$ are arranged to engage with the abutting shoulders $6^{f\prime}$ and in this manner the pads $6^e$ are detachably secured to the plate $6^b$ and also held against relative movement in a longitudinal direction.

To secure a pad $6^e$ to a plate, it is first positioned as shown in dotted lines in Fig. 3 with its projecting member $6^{e\prime}$ opposite to or in registry with the recesses $6^f$, after which, by means of a tool or plunger, the central portion of the pad $6^e$ is forced downwardly into engagement with the face of the plate.

7, $7^a$, indicate a pair of arms which preferably extend rearwardly, that is, toward the vehicle 1. These arms are arranged in the same vertical plane and spaced from each other whereby they may properly support in upright position a rod 8. The arms 7, $7^a$, are preferably integrally connected with the body $6^a$ and formed with alined openings $7^b$ through which the rod 8 extends as shown in the drawings. The openings $7^b$ are of a size to permit free movement of the rod 8 vertically and angularly therein. The upper end of the rod 8 is preferably bent or curved forwardly to form an arm $8^a$ on which is adjustably mounted a clamp 9. This clamp 9, when in operative position, engages the uppermost bow of the set of bows $2^a$ and clamps them upon the rest plate $6^b$. In this manner the plate $6^b$ and clamp 9 coöperate with each other to support and hold the folded top stationary.

As shown in the drawings the collar $6^c$ and body are so arranged, relative to each other that the collar lies midway between the ends of the plate $6^b$. By this arrangement and construction the arms 7, $7^a$, may extend rearwardly without interference with the arm $3^b$ and also support the rod 8 at one side of the rod $3^a$. Another advantage of this construction is that the rod 8 can be moved vertically without contact with the bracket $1^a$. Furthermore the construction lends itself to simplicity and cheapness of construction as well as lightness.

10 indicates means for connecting and clamping the rod 8 to the arms 7, $7^a$, whereby the clamp 9 can be locked in engagement with the uppermost bow and disengaged therefrom at will. Of these means $10^a$ indicates a collar or equivalent device, preferably comprising a nut which has screw-threaded engagement with the rod 8 and adapted to form an abutment that engages with the upper surface of the arm 7 when the rod 8 is clamped or secured in operative position. The engagement of the collar $10^a$ with the adjacent arm 7 is not direct, a yieldable device $10^b$ being interposed between the collar and arm for a purpose to be later described. The nut $10^a$ serves to determine the position of the clamp 9 relative to the plate $6^b$, so that by adjusting the nut longitudinally of the rod 8 in one direction or another the clamp 9 can be adjusted and arranged to properly clamp the uppermost bow.

$10^c$ indicates a locking nut (preferably of the thumb type) adapted to the screw threads of the rod 8. It is arranged below the arm $7^a$ and when tightened it draws the rod 8 and nut $10^a$ downwardly, acting in opposition to the yieldable device $10^b$, and effects a locking operation in a well known manner.

$10^d$ indicates a wall arranged between the arms 7, $7^a$ and extending from the body $6^a$. This wall is preferably an integral part of the arms 7, $7^a$ and body $6^a$. The wall $10^d$ is formed with a cavity $10^e$ in which is mounted a ball $10^f$ and a spring $10^g$, which normally tends to force the ball outwardly. As shown as $10^{c\prime}$ that wall of the nut $10^c$ which engages the arm $7^a$ is formed with a plurality of grooves. When the nut $10^c$ is tightened the ball $10^f$ co-acts with the walls of a groove $10^{c\prime}$ to automatically lock the nut against turning.

The yieldable device $10^b$ preferably comprises a split spring washer which is coiled as shown. It tends to normally elevate the rod 8. The nut $10^c$ is thus always maintained in engagement with the ratchet whereby it is locked against rotation, at the same time, when the nut $10^c$ is loosened, the rod 8 is automatically elevated, thus causing a disengagement of the clamp 9 from the adjacent bow. In this latter position the rod can be easily rotated a quarter turn, positioning the clamp 9 out of the path of movement of the bows—see Fig. 4, whereupon the bows can be folded or unfolded without engagement with the clamp 9 or its supporting rod. The spring $10^b$ also serves to prevent rattling of the parts, and cooperates with the automatic locking means to assist in locking the nut $10^c$.

The clamp 9 preferably comprises a collar $9^a$ and a plate $9^b$, formed integral therewith and arranged in an inverted position.

$9^c$ indicates a recess formed in the collar $9^a$ and the plate $9^b$. This recess is preferably elongated, in the longitudinal direction of the plate $9^b$ and at its opposite ends the recess is reduced in width as shown at $9^d$ to receive and support the opposite ends of a spring member 11.

$9^e$ indicates alined openings formed in and extending through the walls of the collar $9^a$ on opposite sides of the recess $9^c$ and adapted to receive the arm $8^a$. The arm $8^a$ and the openings $9^e$ therefore being round, the latter can be adjusted on the arm angularly as well as laterally, in order to permit the plate $9^b$ to properly engage the adjacent bow $2^a$ when clamped thereagainst.

The spring member 11 preferably comprises a section of resilient wire which is flexed or bowed intermediate its ends to overlie the arm $8^a$. As the tendency of the spring member is to straighten itself out, it bears against the arm $8^a$ with considerable force or friction and thus prevents the clamp 9 from turning normally, thereon.

$8^{a\prime}$ indicates an annular groove formed in the arm $8^a$ to receive the wire 11. This groove serves to secure the spring member to the arm $8^a$ in a manner which permits the clamp to rotate thereon but prevents movement of the spring laterally, and tends to maintain the clamp in a predetermined position.

From this construction it will be seen that the wire section 11 is secured at its opposite ends to the clamp 9 and intermediate its ends to the arm $8^a$. As the recess $9^c$ is of a width greater than the width or diameter of the spring member 11, the construction permits the clamp 9 to be moved laterally on the arm $8^a$ in either direction against the tension of the spring member 11. It will thus be seen that when the rod 8 is drawn downwardly to effect the operation of the clamp 9 in clamping engagement with the uppermost bow $2^a$, the clamp automatically adjusts itself both angularly and laterally on the arm $8^a$ to properly engage the said bow. The free end of the arm $8^a$ may be upset or provided with suitable means to permanently secure the clamp on the arm.

The clamp plate $9^b$ is preferably constructed similarly to the rest plate $6^b$ and provided with a pad $6^e$ which is detachably secured to it.

In a construction such as I have described, it will be seen that all of the supporting members for the upper and lower bow engaging plates are arranged rearward of the bows $2^a$ and that only one operating part is required to lock and release the bows, the operating part being controlled by automatic means that lock such part at all times.

It will also be seen that the support 3, rod 8, and its connections therewith, constitute supporting and spacing means for the rest 6 or its plate $6^d$ and the clamp 9, which in turn constitute a pair of relatively movable bow-engaging and clamping members.

To those skilled in the art of making apparatus of the class described, many alterations in construction and widely differing embodiments and applications of my invention will suggest themselves, without departing from the spirit and scope thereof.

My disclosures and the description herein are purely illustrative and are not intended to be in any sense limiting.

What I claim is:

1. In a device of the character described, the combination of a supporting member, having a rest arranged to support the bows of a vehicle top, a rod movably mounted on said member and provided with a clamp arranged to coöperate with the rest to support the bows, a collar carried by said rod and arranged above said member, a clamping device mounted on said rod below said member and arranged to coöperate with the collar when tightened to draw the rod downwardly and rigidly secure it to said member, ball ratchet mechanism between the said member and clamping device for locking the latter against turning, and a yieldable device interposed between the collar and member tending to normally elevate the rod.

2. In a device of the character described, the combination of a support adapted to be arranged at one side of a vehicle and provided with a horizontal arm, a rest movable toward and from the vehicle on said arm, means for securing the rest to said arm, the said rest including a pair of brackets extending rearwardly therefrom and arranged at one side of said support, the brackets being formed with alined openings, a rod slidably mounted in said openings and provided with an arm at its upper end, a clamp mounted on the last mentioned arm and arranged to coöperate with the rest to support a set of vehicle top bows in folded position, a pair of nuts screw-threaded on said rod and arranged above and below said brackets and coöperating with each other to secure the rod thereto in operative position, a ball ratchet mechanism interposed between one of said nuts and the adjacent bracket for locking said nut against turning movement, and a yieldable member arranged between the other nut and the adjacent bracket tending to normally elevate the said rod.

3. In a device of the character described, the combination of a support adapted to be arranged at one side of a vehicle and having a rest movable toward and from the vehicle thereon, means for securing the rest to said support, the said rest being provided with a pair of spaced brackets extending rearwardly therefrom and arranged at one side of said support, the brackets being formed with alined openings, a rod slidably and rotatably mounted in said openings and provided with an arm at its upper end, a plate mounted on the last mentioned arm and arranged to coöperate with the rest to support a set of top bows in folded position, a pair of nuts screw-threaded on said rod and arranged above and below said brackets and coöperating with each other to secure the rod thereto in operative position, a ball ratchet mechanism interposed between the lower bracket and the adjacent nut for locking the latter against turning movement, and a spring interposed between the other nut and the adjacent bracket arranged to be put under tension when the first mentioned nut is operated.

4. In a device of the character described, the combination of supporting means adapted to be arranged at one side of a vehicle and including a plate on which the bows of the vehicle top rest, said supporting means being formed with alined openings, a rod extending through and adjustably mounted in said openings, the said rod being provided with a clamping plate coöperating with the rest plate to support the bows in folded position, and provided with screw threads at its lower end, a nut engaging with the screw threaded end of the rod for securing it to said supporting means, a ball ratchet mechanism between the supporting means and the nut for locking the latter against turning, and means tending to elevate said rod and arranged to be compressed when said nut is tightened.

5. In a device of the character described, the combination of a support adapted to be arranged at one side of a vehicle for supporting a set of top bows, a device for clamping the bows on said support comprising a vertically adjustable member having an arm and a clamp mounted thereon and a spring member carried by said clamp and connected to said arm intermediate its ends for securing the clamp thereto and permitting it to move angularly and laterally thereon against the tension of said spring member, and means for operating said clamping device.

6. In a device of the character described, the combination of a support adapted to be arranged at one side of a vehicle for supporting a set of top bows, a device for clamping the bows on said support comprising a vertically adjustable member having an arm formed with an annular groove, a clamp mounted thereon and formed with a recess, and a spring member mounted in said recess and having its opposite ends secured to said clamp, the said spring member being arranged within the groove of the arm intermediate its ends, whereby the clamp is secured to said arm but permitted to move angularly and laterally thereon against the tension of said spring member, and means for operating said clamping device.

7. In a device of the character described, the combination of a support on which the bows of a vehicle top are adapted to rest, a member movable vertically relative to said support and provided with an arm, a clamp mounted on said arm and arranged to engage the uppermost bow of the set of bows to clamp said bows on the support, the said clamp being formed with a recess, and a spring arranged within said recess secured at its opposite ends to said clamp and yieldingly engaging said arm intermediate its ends, the said recess being wider than the width of said spring and the arm being formed with an annular groove to receive the spring for connecting it to said arm, whereby the said clamp when moved into engagement with the adjacent bow, may adjust itself thereto by angular and lateral movement on said arm against the tension of the spring, and means for drawing said vertically movable member downwardly to clamp the bows.

8. In a device of the character described, a pair of relatively movable bow engaging and clamping members for clamping a set of bows in folded position therebetween, supporting and spacing means for said bow engaging and clamping members, one of said bow engaging and clamping members being mounted on said supporting and spacing means to swing thereupon and automatically adjust itself angularly to the inclination of an adjacent bow by engagement therewith and being bodily movable laterally to and fro on and relative to said supporting and spacing means and means for causing the said member to frictionally engage said supporting and spacing means.

9. In a device of the character described, a pair of relatively movable bow engaging and clamping members for clamping a set of bows in folded position therebetween, supporting and spacing means for said bow engaging and clamping members, one of said bow engaging and clamping members being mounted on said supporting and spacing means to swing thereupon and to move bodily laterally relative thereto, and a yielding device interposed between said supporting and spacing means and said movable bow engaging and clamping member serving to oppose the bodily movement and swinging movement of said bow engaging and clamping member upon the supporting and spacing means.

10. In a device of the character described, the combination of a support adapted to be fixed to the body, a rest plate carried by said support, a rod slidably and rotatably supported by said support, the upper end of said rod having a laterally extending arm, a plate rotatably mounted on said arm and arranged to clamp the uppermost bow of a set of vehicle top bows, a resilient device carried by said plate and arranged to engage said arm and frictionally oppose the rotation of said plate relatively thereto but permitting the plate to adjust itself to the inclination of the adjacent bow when drawn downwardly into clamping engagement therewith, and means for drawing the rod downwardly.

11. The combination of a normally stationary rest adapted to be fixed to the side of a vehicle and arranged to support the bows of a vehicle top, a clamping member for engaging the bows of the top and cooperating with the rest to rigidly hold the bows in folded position, supporting means for the clamping member permitting it to move vertically toward and from said rest and also to swing horizontally, and a friction device interposed between the clamping member and its supporting means permitting the clamping member to automatically move bodily laterally on said supporting means and to adjust itself to the inclination of the adjacent bow when being clamped in engagement therewith.

12. In a device of the character described, the combination of a support adapted to be arranged at one side of a vehicle for supporting a set of top bows, a device for clamping the bows on said support comprising a vertically adjustable member having an arm formed with an annular groove, a clamp mounted thereon and formed with a recess, and a spring member mounted centrally in said recess and connected on opposite sides of said arm to said clamp, the said spring member being arranged within the groove of the arm intermediate its ends, whereby the clamp is secured to said arm but permitted to move angularly and laterally thereon against the tension of said spring member, the side walls of said recess operating to limit the lateral movement of the clamp on said arm, and means for operating said clamping device.

13. In a device of the character described, the combination with a support adapted to be arranged at one side of a vehicle, of a plate mounted on said support and having lips arranged along its opposite longitudinal sides, the said lips extending toward each other, the inner walls of the lips being cut away intermediate their ends to form recesses, the end walls of which form shoulders, and a pad mounted on said plate and having its opposite sides extended into said recesses, whereby said shoulders operate to prevent endwise movement of the pad relatively to the plate.

14. In a device of the character described, the combination with a support adapted to be arranged at one side of a vehicle, of a channeled plate mounted on said support and having flanges extending along its opposite longitudinal side edges, the said flanges being spaced to receive the opposite edges of a pad and also cut away to form shoulders near their opposite ends, and a pad mounted on said plate and having members projecting laterally from its opposite longitudinal sides, the said projecting members extending into said recesses and the opposite end walls thereof engaging said shoulders to secure the pad to said plate.

15. In a device of the character described, the combination of a support adapted to be arranged at one side of a vehicle, the said support including a rest on which a set of vehicle top bows may be supported, a device for clamping the bows on said rest, the said device comprising a movable member having an arm formed with an annular groove, a clamp mounted on and bodily movable laterally and angulary relative to said arm and a spring carried by said clamp and arranged within the groove of said arm and engaging the walls thereof to oppose angular and lateral movement of said clamp on the arm, and means for securing said clamping devices to said support.

16. The combination of a stationary rest for the bows of a vehicle top, a clamping member arranged to coöperate with the rest for clamping the bows in folded position, supporting means for said clamping member including an arm on which it is rotatably mounted, the said clamping member being formed with a recess, and a resilient member overlying said arm and bent intermediate its ends to permit its opposite ends to engage the walls of said recess on opposite sides of said arm for frictionally securing the clamping member thereto and permitting the adjustment of said clamping member to the inclination of the bows.

17. A folding vehicle top holder comprising a lower member having means to receive the lower side of a folding vehicle top and also having attaching means and a vertical guide opening; an upper member to engage over the upper side of a folded vehicle top, a connecting rod attached to the upper member and slidable in the vertical opening of the lower member, means to secure said rod at any desired adjustment to said lower member, the said rod being revoluble in the opening of the lower member, and the upper member being pivotally connected to the upper end of the said rod.

In testimony whereof, I affix my signature in presence of two witnesses.

HARRY B. WHITE.

Witnesses:
S. G. ZIMMERMAN,
LEWIS M. WIBLE.

Copies of this patent may be obtained for five cents each, by addressing the "Commissioner of Patents, Washington, D. C."